(12) United States Patent
Freter (10) Patent No.: US 11,130,090 B2
(45) Date of Patent: Sep. 28, 2021

(54) FUEL VAPOR BUFFERING APPARATUS

(71) Applicant: A. Kayser Automotive Systems GmbH, Einbeck (DE)

(72) Inventor: Heiko Freter, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 220 days.

(21) Appl. No.: 16/380,124

(22) Filed: Apr. 10, 2019

(65) Prior Publication Data

US 2019/0351364 A1 Nov. 21, 2019

(30) Foreign Application Priority Data

May 17, 2018 (DE) .......................... 102018004001.2

(51) Int. Cl.
*B01D 59/26* (2006.01)
*B01D 53/04* (2006.01)
(Continued)

(52) U.S. Cl.
CPC ..... *B01D 53/0407* (2013.01); *B01D 46/0036* (2013.01); *B01D 46/521* (2013.01); *F02M 25/089* (2013.01); *F02M 25/0854* (2013.01); *B01D 27/04* (2013.01); *B01D 46/0002* (2013.01); *B01D 46/0008* (2013.01);
(Continued)

(58) Field of Classification Search
CPC ............ B01D 53/0407; B01D 46/0036; B01D 46/521; B01D 2259/4516; B01D 2253/102; B01D 2257/708; B01D 2257/702; B01D 2259/41; B01D 2259/402; B01D 46/0008; B01D 46/10; B01D 46/24; B01D 46/40; B01D 53/04; B01D 53/72; B01D 27/04; F02M 25/089; F02M 25/0854; F02M 25/08
See application file for complete search history.

(56) References Cited

U.S. PATENT DOCUMENTS 3,505,794 A * 4/1970 Nutter ................ B01D 46/2411
                                                    55/487
4,130,487 A * 12/1978 Hunter ................... B01D 27/06
                                                    210/259
(Continued)

FOREIGN PATENT DOCUMENTS

CN          1477303 A       2/2004
CN        203067130 U       7/2013
(Continued)

*Primary Examiner* — Dung H Bui
(74) *Attorney, Agent, or Firm* — Richard M. Goldberg (57) ABSTRACT

A filter system (1), in particular as part of a fuel vapor buffering apparatus to reduce hydrocarbon emissions, wherein the filter system (1) includes at least: a primary filter apparatus (2) including a primary filter housing (4) and adsorption, or respectively absorption material; and a secondary filter apparatus (3) including adsorption, or respectively absorption material; wherein the secondary filter apparatus (3) is provided on the atmosphere side to the primary filter apparatus (2); and wherein the primary filter apparatus (2) and the secondary filter apparatus (3) are arranged in the filter system (1) such that a gas conducted into the filter system (1) flows through the primary filter apparatus (2) and the secondary filter apparatus (3).

12 Claims, 7 Drawing Sheets

Section 2-2

(51) Int. Cl.
    *B01D 46/00*     (2006.01)
    *B01D 46/52*     (2006.01)
    *F02M 25/08*     (2006.01)
    *B01D 46/24*     (2006.01)
    *B01D 46/10*     (2006.01)
    *B01D 46/04*     (2006.01)
    *B01D 53/72*     (2006.01)
    *B01D 27/04*     (2006.01)

(52) U.S. Cl.
    CPC .............. *B01D 46/04* (2013.01); *B01D 46/10* (2013.01); *B01D 46/24* (2013.01); *B01D 53/72* (2013.01); *B01D 2253/102* (2013.01); *B01D 2257/708* (2013.01); *B01D 2259/402* (2013.01); *B01D 2259/41* (2013.01); *B01D 2259/4516* (2013.01); *F02M 25/08* (2013.01)

(56) References Cited

U.S. PATENT DOCUMENTS

| | | | | |
|---|---|---|---|---|
| 4,418,662 | A * | 12/1983 | Engler | B01D 46/0036 123/198 D |
| 4,634,458 | A * | 1/1987 | Craig | B01D 46/0021 210/315 |
| 5,310,548 | A * | 5/1994 | Tsuru | A61L 9/01 424/402 |
| 5,992,397 | A * | 11/1999 | Hideaki | F02M 25/0854 123/538 |
| 7,052,532 | B1 * | 5/2006 | Liu | F01N 3/0224 96/154 |
| 8,215,290 | B2 * | 7/2012 | Dunkle | F02M 33/08 123/516 |
| 9,359,977 | B2 * | 6/2016 | Brock | F02M 25/0872 |
| 10,427,081 | B1 * | 10/2019 | Newman | B01D 46/10 |
| 10,632,458 | B2 * | 4/2020 | Boger | F01N 3/2828 |
| 2001/0052224 | A1 * | 12/2001 | Gelderland | B01D 53/02 55/521 |
| 2003/0019361 | A1 * | 1/2003 | Wolff | B01D 39/2062 96/134 |
| 2004/0226440 | A1 * | 11/2004 | Foong | F02D 21/08 95/146 |
| 2006/0130659 | A1 * | 6/2006 | Durst | B01D 46/0036 96/134 |
| 2006/0272508 | A1 * | 12/2006 | Hoke | B01D 53/0415 96/134 |
| 2010/0059422 | A1 * | 3/2010 | Hahn | B01D 29/216 210/90 |
| 2010/0275586 | A1 * | 11/2010 | Hirata | F01N 3/0871 60/299 |
| 2010/0296966 | A1 * | 11/2010 | Bae | B01J 20/0233 422/4 |
| 2013/0000609 | A1 | 1/2013 | Yamamoto et al. | |
| 2013/0071298 | A1 * | 3/2013 | Tanimura | B03C 3/02 422/187 |
| 2016/0096163 | A1 * | 4/2016 | House | B01J 20/18 95/141 |
| 2016/0129383 | A1 * | 5/2016 | Volk | B60H 3/0608 96/131 |
| 2017/0113172 | A1 * | 4/2017 | Yoshida | B01D 53/0407 |
| 2017/0122267 | A1 * | 5/2017 | Anderson | B01D 53/0407 |
| 2018/0326406 | A1 * | 11/2018 | Stuhler | B01D 53/08 |
| 2018/0345204 | A1 * | 12/2018 | Byeon | B01D 53/02 |
| 2018/0372029 | A1 * | 12/2018 | Spada | B01D 53/0407 |
| 2019/0001078 | A1 * | 1/2019 | Kane | B01D 50/002 |
| 2019/0263226 | A1 * | 8/2019 | Gruenbeck | B01D 53/885 |
| 2019/0388631 | A1 * | 12/2019 | Silver | B01D 46/0008 |
| 2020/0129907 | A1 * | 4/2020 | Fox | B01D 46/10 |

FOREIGN PATENT DOCUMENTS

| | | |
|---|---|---|
| CN | 205638732 U | 10/2016 |
| CN | 108026869 A | 5/2018 |
| JP | 2002030998 A | 1/2002 |
| JP | 2003003914 A | 1/2003 |

\* cited by examiner

Section 3-3

Section 6-6

FUEL VAPOR BUFFERING APPARATUS

BACKGROUND OF THE INVENTION

The invention relates to a filter system, in particular as part of a fuel vapor buffering apparatus of a motor vehicle to reduce hydrocarbon emissions.

The activated carbon filter systems, or respectively fuel vapor buffering apparatuses installed in vehicles that are termed activated carbon filters in professional circles and are for preventing vapors from escaping from the fuel tank into the environment, generally have activated carbon granules. The air in the tank must be removed through the activated carbon filter in the event of filling up and temperature-related expansion of the tank contents. The activated carbon filter is therefore to prevent fuel vapors from entering into the atmosphere. The thresholds for permissible hydrocarbon emissions by the fuel vapor buffering apparatuses are particularly low, in particular for vehicles that come onto the US market, so that very frequently, a separate, or respectively additional filter system must be used in this market in the fuel vapor buffering apparatuses in addition to the activated carbon granules.

The separate, or respectively additional filter systems generally also have activated carbon for binding hydrocarbons that are not filtered out by the activated carbon granules. The separate, or respectively additional filter systems can be designed in various ways depending on the requirements such as for example desired filter performance and/or available installation space.

SUMMARY OF THE INVENTION

It is therefore an object of the present invention to provide activated carbon filter systems, in particular as additional filter systems, as part of a fuel vapor buffering apparatus for different requirements.

This object is achieved by the features of the independent claims. Preferred embodiments are the subject matter of the dependent claims.

An initial element of the invention relates to a filter system, in particular as part of a fuel vapor buffering apparatus of a motor vehicle to reduce hydrocarbon emissions, wherein the filter system comprises at least: a primary filter apparatus comprising a primary filter housing and adsorption and/or absorption material, preferably activated carbon granules; and a secondary filter apparatus comprising adsorption, or respectively absorption material, preferably activated carbon; wherein the secondary filter apparatus is basically provided on the atmosphere side to the primary filter apparatus; and wherein the primary filter apparatus and the secondary filter apparatus are arranged in the filter system such that a gas conducted into the filter system flows through the primary filter apparatus and the secondary filter apparatus.

In principle, the primary filter apparatus can have different types of filter devices and/or adsorption, or respectively absorption materials. Adsorption, or respectively absorption materials within the meaning of this application can be activated carbon, carbon, zeolites, porous polymers, porous aluminum oxide, porous silicon oxide, molecular sieves, kaolin, titanium oxide and/or cerium oxide. Particularly preferably, the primary filter apparatus comprises activated carbon granules, or respectively an activated carbon fill. Activated carbon as a material for absorbing, or respectively adsorbing can be obtained within the meaning of this application from various starting materials such as wood, wood shavings, sawdust, cotton, peat, coal, coconut, lignite, carbohydrate, petroleum pitch, petroleum coke, coal tar, fruit peels, fruit seeds, nut shells, kernels, sawdust, palm trees, vegetables such as rice husks or rice straw, synthetic polymers, natural polymers and/or lignocellulose material, with the assistance of various methods such as chemical activation and/or thermal activation. In the context of this application, the expression "activated carbon" is only used as an example since the aforementioned materials can be used in addition or instead of them. The secondary filter apparatus is preferably arranged in the filter system such that gases, or respectively vapors from the fuel tank first flow through the primary filter apparatus before they flow through the secondary filter apparatus. Also preferably, the filter system comprises one or more additional filter systems that are provided before, after and/or between the primary filter apparatus and the secondary filter apparatus.

In a preferred embodiment, the secondary filter apparatus comprises: a plurality of channels, wherein the channels are preferably and substantially designed closed and are suitable for gases to flow through; and a filter wall, wherein the filter wall encloses the channels; wherein the filter wall and the walls of the channels of the secondary filter apparatus are formed integrally, or respectively as a single part with the primary filter housing of the primary filter apparatus; and wherein the inside of the filter wall, i.e., the side facing the interior of the secondary filter apparatus, and the walls of the channels of the secondary filter apparatus have, at least in regions, a surface coating comprising activated carbon for absorbing and/or adsorbing materials, in particular hydrocarbon materials.

The filter wall and the walls of the channels are formed integrally, or as a single part, with the primary filter housing, i.e., the filter wall and walls of the channels are part of the primary filter housing. Particularly preferably, the primary filter housing, the filter wall and the walls of the channels are produced in one production step. Alternatively and/or in addition, the primary filter housing, the filter wall in the walls of the channels are produced using the same production method and/or are joined in one or more work step(s) and tightly connected to each other, in particular welded, soldered and/or adhered. Alternatively and/or in addition, at least the filter wall and the walls of the channels are shaped, or respectively produced by one or more machining methods, in particular turning, drilling and/or milling.

Preferably, the filter wall and the walls of the channels are provided afterward with activated carbon, or respectively activated carbon-containing materials, which can be done with the assistance of a plurality of methods, for example by dipping the entire primary filter housing, or at least the region comprising the filter wall and the channels, in a dipping bath with liquid that comprises activated carbon, and/or applying an activated carbon containing material using a lacquer spray gun/paint spray gun on at least in the region comprising the filter wall and the channels.

Preferably, the filter wall is designed substantially cylindrical, or respectively tubular, and/or elongated. Alternatively and/or in addition, the filter wall can have a substantially polygonal cross-section.

Preferably, at least one part, more preferably a majority of the channels have a cross-section that is substantially round, oval, elliptical, triangular, rectangular, pentagonal, hexagonal and/or X-cornered. Alternatively and/or in addition, the channels have different cross-sections and/or are arranged in an ordered and/or diffuse pattern.

Preferably, at least some of the channels are oriented substantially in an axial direction of the filter wall, and/or substantially linear, and/or run substantially parallel to each other. Alternatively and/or in addition, at least some of the channels are curved, or respectively have windings and/or curves.

In another preferred embodiment, the secondary filter apparatus comprises: a filter sleeve comprising an elongated hollow body; wherein the filter sleeve is designed integral, or respectively as a single part with the primary filter housing of the primary filter apparatus; and a filter body, wherein the filter body is held releasably in the filter sleeve, and the filter body comprises: a plurality of channels, wherein the channels are designed preferably and substantially closed and are suitable for gases to flow through; and a filter wall on the outer perimeter of the filter body; wherein the channel walls and the filter wall consist of a carrier material, in particular plastic and/or ceramic; and wherein the carrier material of the filter body at least partially has a surface coating comprising activated carbon.

The filter sleeve is formed integrally, or respectively as a single part with the primary filter housing, i.e., the filter sleeve is part of the primary filter housing. Particularly preferably, the primary filter housing and the filter sleeve are produced in one production step. Alternatively and/or in addition, the primary filter housing and the filter sleeve are produced using the same production method and/or are joined in one or more work step(s) and tightly connected to each other, in particular welded, soldered and/or adhered. Alternatively and/or in addition, at least the filter sleeve is shaped, or respectively produced by one or more machining methods, in particular turning, drilling and/or milling. The filter sleeve is preferably designed such that the filter body can be inserted into the filter sleeve and held therein. Particularly preferably, the filter body is releasably attached in the filter sleeve so that it can be easily exchanged as needed.

Preferably, the filter body substantially consists of activated carbon, or respectively an activated-carbon-containing material, and has a plurality of channels, or the channels are preferably and substantially designed closed and are suitable for gases to flow through. Preferably, at least one part, more preferably a majority of the channels have a cross-section that is substantially round, oval, elliptical, triangular, rectangular, pentagonal, hexagonal and/or X-cornered. Alternatively and/or in addition, the channels have different cross-sections and/or are arranged in an ordered and/or diffuse pattern.

Particularly preferably, the filter body consists of a carrier material, in particular plastic and/or ceramic, wherein the carrier material at least partially has a coating comprising activated carbon. The carrier material can be produced from a plurality of materials and with a plurality of production methods. In particular, plastics are suitable, in particular temperature-resistant plastics, and ceramics. The carrier material is provided with activated carbon, or respectively activated-carbon-containing materials which can be done by a plurality of methods, for example by dipping the carrier material in a dipping bath with liquid that comprises activated carbon and/or applying an activated-carbon-containing material by a lacquer spray gun/paint spray gun.

In another preferred embodiment, the secondary filter apparatus comprises: a filter sleeve comprising an elongated hollow body; wherein the filter sleeve is designed integrally, or respectively as a single part with the primary filter housing of the primary filter apparatus; and a filter material, wherein the filter material is held releasably in the filter housing, and wherein the filter housing comprises activated carbon, and gas conducted into the filter system flows through at least in regions.

As described above, the filter sleeve is formed integrally, or respectively as a single part with the primary filter housing. In this preferred embodiment, the filter sleeve is designed such that a filter material, in particular an air filter comprising paper, is inserted into the filter sleeve and can be held therein, wherein the gas flows through at least one part of the filter material. Preferably, the filter material has activated carbon.

Particularly preferably, the filter material is a paper filter that at least in regions has a coating and/or fibers comprising activated carbon. Particularly preferably, the filter material possesses the shape of a radial filter, or respectively a star filter. Alternatively and/or in addition, the filter material can comprise fleece, foam and/or plastic fibers, wherein gas conducted into the filter system flows radially through the filter material. Alternatively and/or in addition, the filter material can comprise chambers, or respectively pockets with activated carbon powder and/or activated carbon granules.

In another preferred embodiment, the secondary filter apparatus comprises a filter line with an elongated hollow body; wherein at least one part of the inside of the filter line has a surface coating comprising activated carbon.

Preferably, the filter line is connected to the primary filter housing of the primary filter apparatus such that gases, or respectively vapors from the fuel tank first flow through the primary filter apparatus before they flow through the secondary filter apparatus. The elongated hollow body of the filter line has a diameter-to-length ratio preferably within a range of about 1:3 to about 1:300, more preferably within a range of about 1:10 to about 1:100.

The filter line is preferably a tubular line with a substantially round cross-section. Alternatively and/or in addition, the filter line can have a polygonal cross-section. Alternatively and/or in addition, the filter line can have a variable and/or constant diameter. The filter line can be designed substantially straight and/or curved, and/or have several sections, wherein the sections each can be designed substantially straight and/or curved. Alternatively and/or in addition, the filter line can have branches and/or junctions. Alternatively and/or in addition, the filter line can have several sections that are joined to each other.

More preferably, at least one part of the inside of the filter line is provided with activated carbon, or respectively activated-carbon-containing materials which can be done by a plurality of methods, for example by dipping the filter line in a dipping bath with liquid that comprises activated carbon and/or applying an activated-carbon-containing material by a paint wand inserted into the filter line.

In another preferred embodiment, the secondary filter apparatus comprises a filter housing with a filter material, wherein the filter material has activated carbon, and gas conducted into the filter system flows through at least in regions.

The filter material of the secondary filter apparatus preferably has activated carbon. Particularly preferably, the filter material is a paper filter that at least in regions has a coating and/or fibers comprising activated carbon. Particularly preferably, the filter material possesses the shape of a radial filter, or respectively a star filter. Alternatively and/or in addition, the filter material can comprise fleece, foam and/or plastic fibers. Alternatively and/or in addition, the filter material can comprise chambers, or respectively pockets with activated carbon powder and/or activated carbon granules.

In another preferred embodiment, the filter system comprises another filter apparatus on the atmosphere side of the secondary filter apparatus, wherein the other filter apparatus comprises a filter housing with a filter material, wherein the filter material has activated carbon, and gas conducted into the filter system flows through at least in regions.

All filter apparatuses according to one element of the invention can be combined in any number, and/or arrangement, or respectively sequence. Alternatively and/or in addition, the described filter apparatuses can be used independently and/or in combination with conventional filter systems, in particular a filter apparatus comprising a filter line with an elongated hollow body, wherein at least one part of the inside of the filter line has a surface coating comprising activated carbon.

The invention is explained in greater detail below with reference to exemplary embodiments illustrated in figures.

DETAILED DESCRIPTION OF THE DRAWINGS

Figure 1:
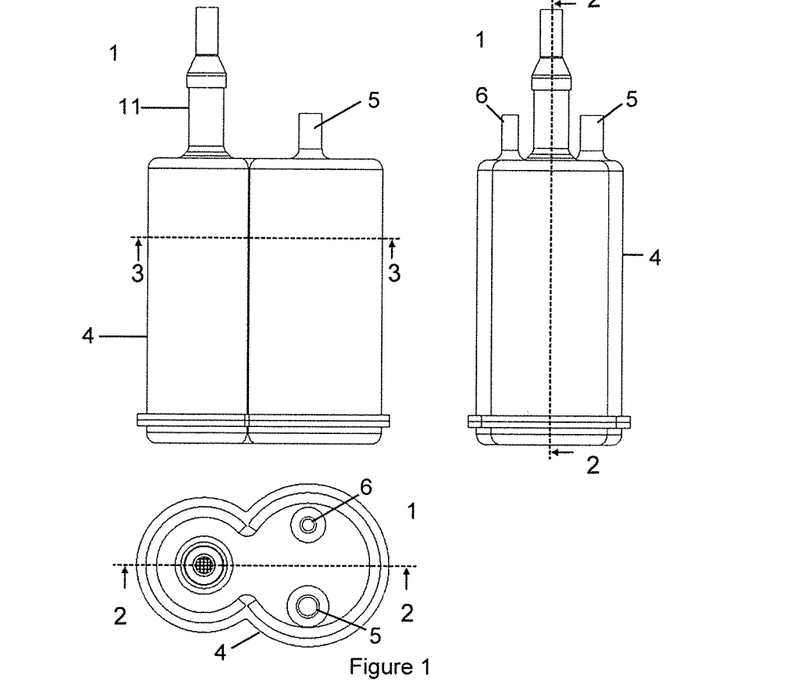
FIG. 1 shows different views of a filter system comprising a filter wall according to a preferred embodiment of the invention.

FIG. 1 shows a filter system according to one element of the invention. The filter system 1 comprises a primary filter apparatus 2 with a primary filter housing 4. The filter system 1 also has a filter wall 11 that is tightly connected to the primary filter housing 4. Preferably, the filter wall 11 and the primary filter housing 4 are designed as a single part and produced using an injection molding method. The primary filter housing 4 also has a tank connection 5 by means of which the primary filter housing 4 is connected to the tank so that the fuel vapors can pass from the tank into the primary filter housing 4. Moreover, the primary filter housing 4 has a purging connection 6. Purging air conducted into the filter system 1 for cleaning the filter apparatuses escapes through the purging connection 6 and is further fed to the combustion air of the engine of the motor vehicle. In so doing, the purging air flows through the secondary filter apparatus 3 and the primary filter apparatus 2 and is then conducted out of the filter system 1 through the purging connection 6.

Figure 2:
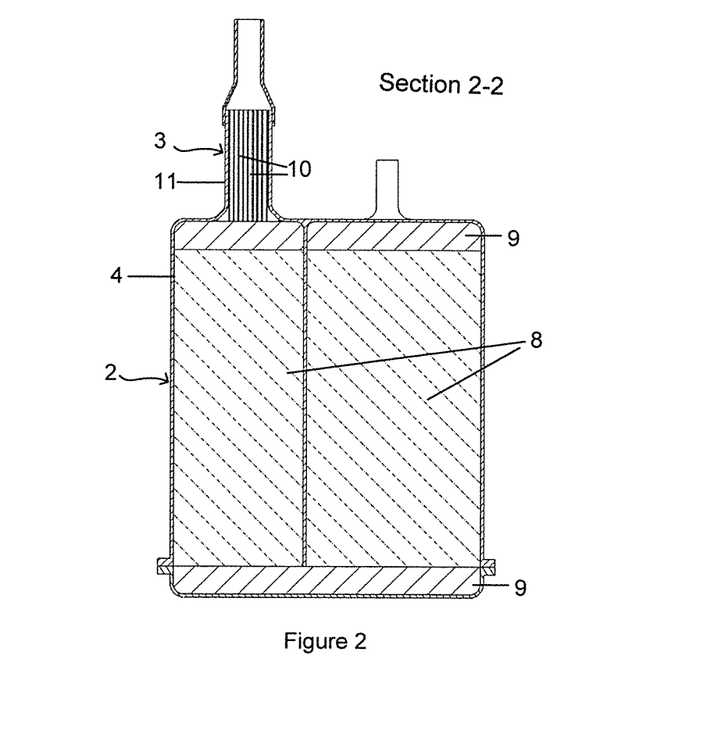
FIG. 2 shows a cross-section along line 2-2 of the filter system from FIG. 1.

FIG. 2 shows a cross-section along line 2-2 of the filter system 1 from FIG. 1. The primary filter housing 4 of the primary filter apparatus 2 encloses a cavity that can contain an adsorbent, or respectively absorbent material such as activated carbon granules 8. Moreover, the filter system 1 has a secondary filter apparatus 3 with a plurality of channels 10 and a filter wall 11. The secondary filter apparatus 3 is located in relation to the tank connection 5, or respectively purging connection 6 on the atmosphere side of the primary filter apparatus 2. The walls of the channels 10 and the filter wall 11 are formed integrally with the primary filter housing 4. In the depicted exemplary embodiment, the cavity of the primary filter housing 4 is divided into two chambers that are connected to each other. The filter system 1 has porous foam 9 in the regions of the tank connection 5, the purging connection 6, the connection of the two chambers, and the connection to the secondary filter apparatus 3 that fixes the activated carbon fill 8 in the primary filter housing 4 without preventing the flow of gases.

Figure 3:
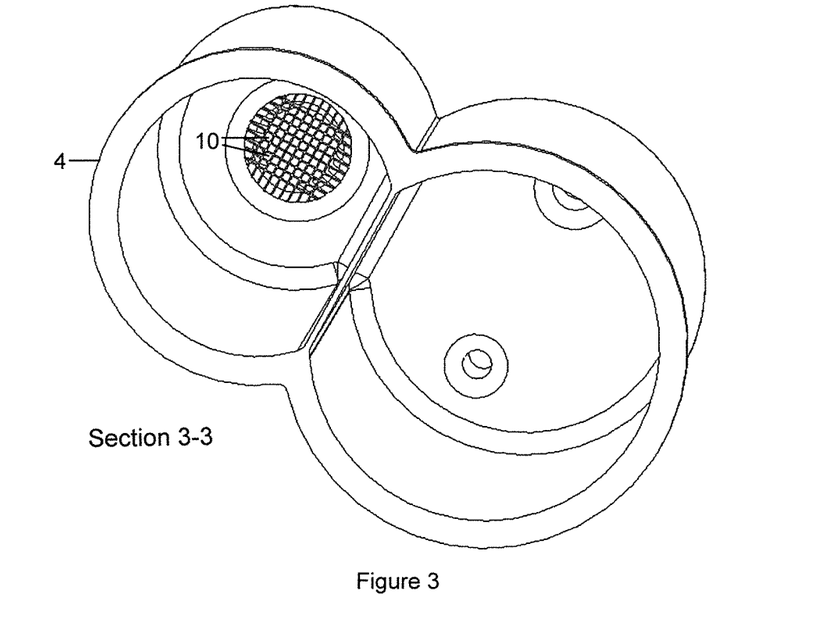
FIG. 3 shows a perspective view of the filter system from FIG. 1 cut along line 3-3.
Figure 4:
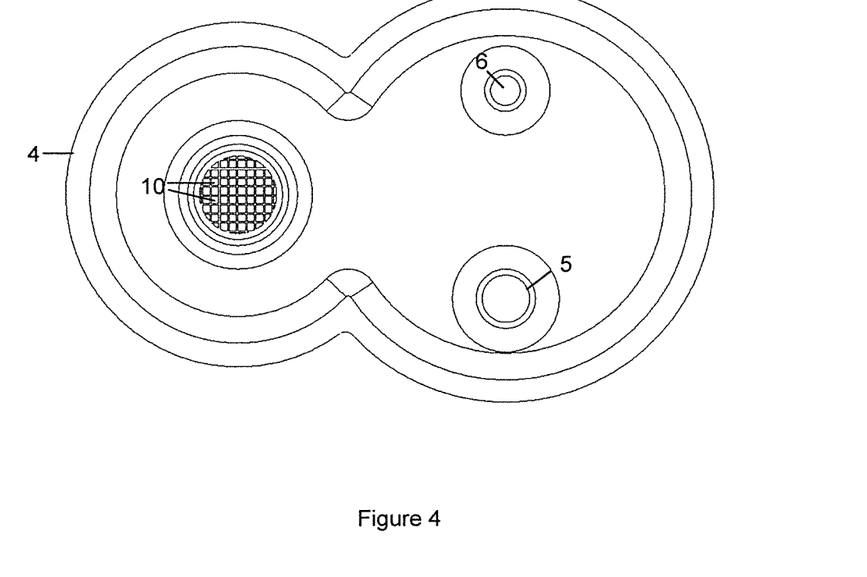
FIG. 4 shows a view of the filter system from FIG. 1.

FIG. 3 shows a perspective view of the filter system 1 from FIG. 1 cut along line 3-3. As can also be discerned from FIG. 4, the channels 10 of the secondary filter apparatus 3 possess a square cross-section. Alternatively and/or in addition, the channels 10 can also for example have round or elongated cross-sections. The tank connection 5 and the purging connection 6 are located in the same region of the primary filter housing 4. This ensures that both the fuel vapors as well as the purging air flow through the same regions of the filter system 1, although in the opposite direction.

Figure 5:
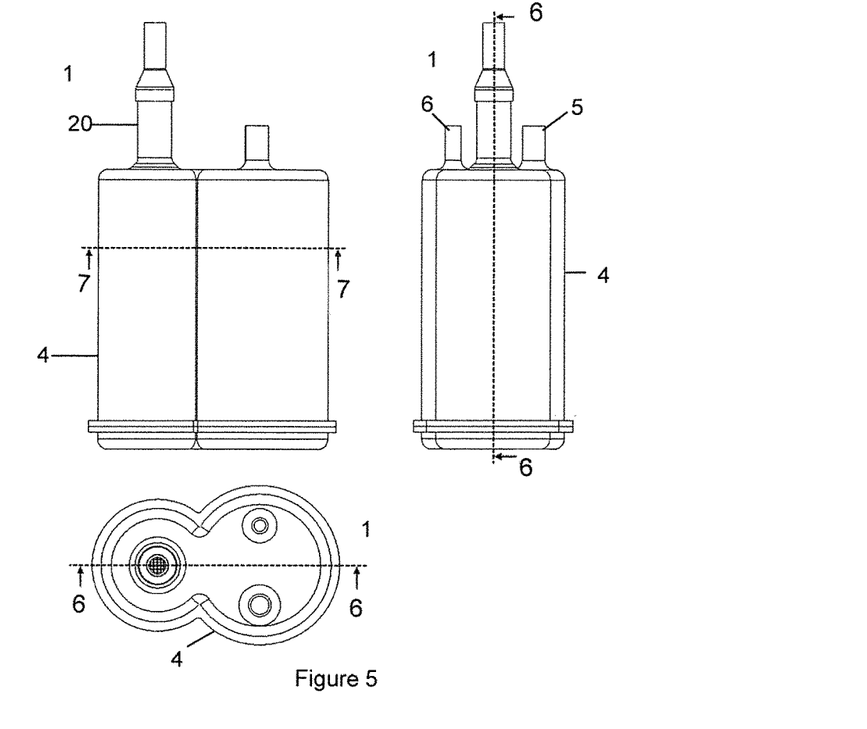
FIG. 5 shows different views of a filter system comprising a filter sleeve and a filter body according to another preferred embodiment of the invention.

FIG. 5 shows a filter system 1 according to another preferred embodiment of the invention. The filter system 1 comprises a primary filter apparatus 2 with a primary filter housing 4. The filter system 1 also has a filter sleeve 20 that is tightly connected to the primary filter housing 4, or respectively is formed as a single part therewith. The primary filter housing 4 also has a tank connection 5 that connects the primary filter housing 4 to the tank. The purging air that cleans the adsorbent, or respectively absorbent material of the secondary filter apparatus 3 and the primary filter apparatus 2 passes out of the filter system 1 through the purging connection 6 and is fed to the combustion air of the engine.

Figure 6:
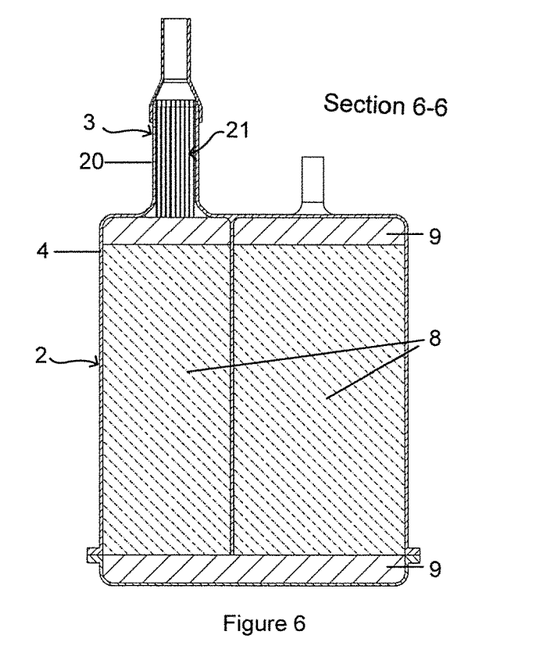
FIG. 6 shows a cross-section along line 6-6 of the filter system from FIG. 5.

FIG. 6 shows a cross-section along line 6-6 of the filter system 1 from FIG. 5. The filter system 1 has a secondary filter apparatus 3 with a filter sleeve 20 and a filter body 21. The secondary filter apparatus 3 is located on the atmosphere side of the primary filter apparatus 2. The filter sleeve 20 is formed integrally with the primary filter housing 4 and accommodates the filter body 21. Alternative to the shown embodiment in which the secondary filter apparatus 2 has an elongated filter body 21 with a plurality of channels 22, the filter sleeve 20 can for example have a star filter comprising paper or fleece.

Figure 7:
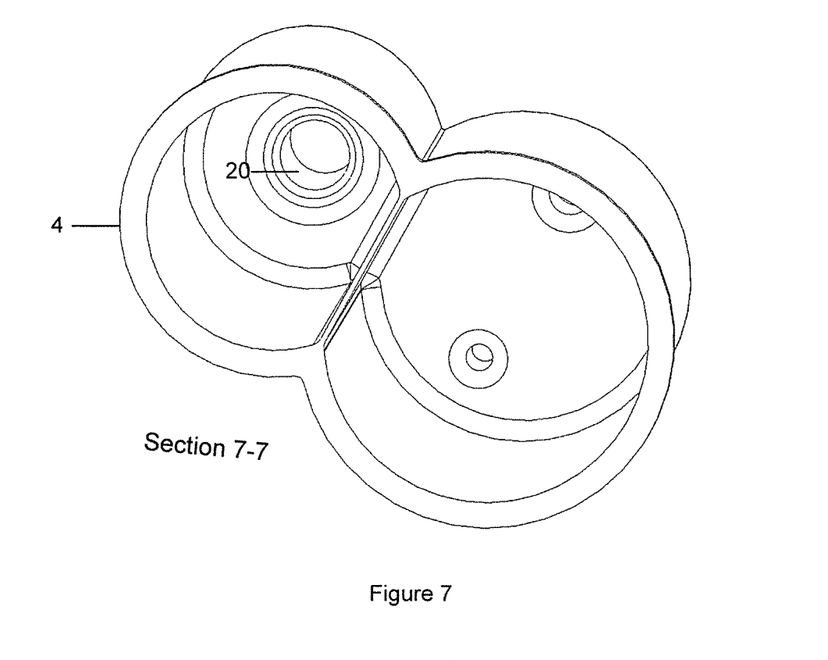
FIG. 7 shows a perspective view of the filter system from FIG. 5 cut along line 7-7.

FIG. 7 shows a perspective view of the filter system 1 from FIG. 5 cut along line 7-7, wherein neither a filter body 21 nor a star filter is located within the filter sleeve 20.

Figure 8:
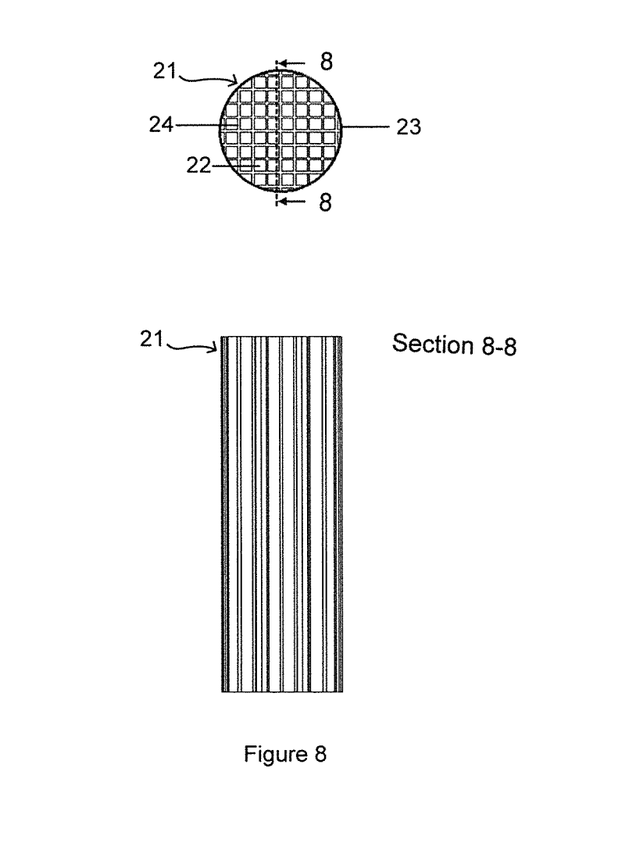
FIG. 8 shows different views of a filter body for use with the filter system in FIG. 5, including a cross-section along line 8-8 of the filter system of FIG. 7.

FIG. 8 shows a filter body 21 for use with the filter system 1 shown in FIG. 5. The shown filter body 21 possesses channels 22 with a square cross-section, linear channel walls 24, and a filter wall 23 that encloses the channels 22. The shown filter body 21 is especially suitable for inserting into the filter sleeve 20 of the secondary filter apparatus 3 of a filter system 1 as for example shown in FIGS. 5 and 6. FIG. 8 also shows a cross-section of the filter body along line 8-8.

Figure 9:
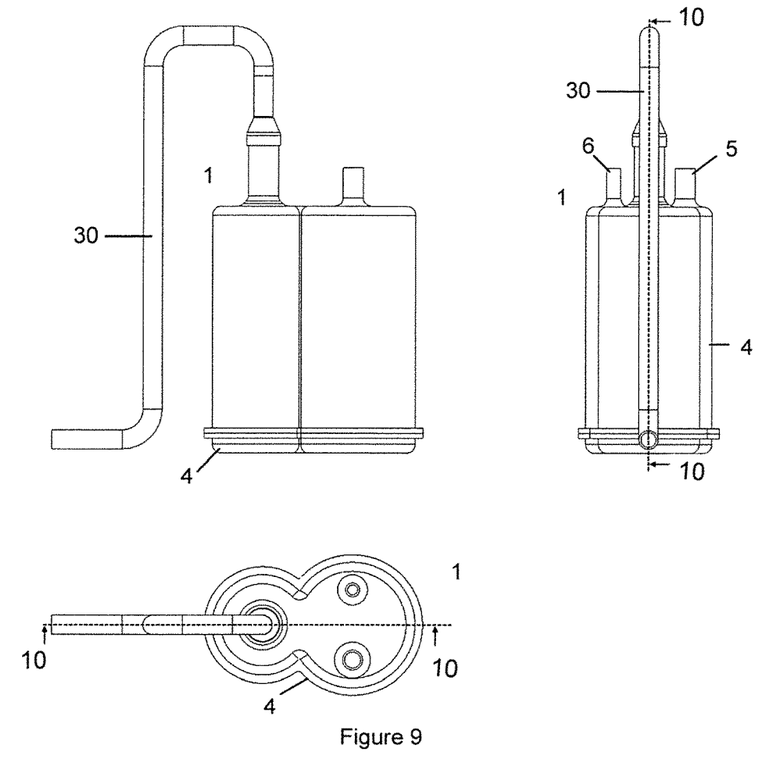
FIG. 9 shows different views of a filter system comprising a filter line according to another preferred embodiment of the invention.

FIG. 9 shows a filter system 1 according to another preferred exemplary embodiment of the invention. The filter system 1 comprises a primary filter apparatus 2 with a primary filter housing 4. The filter system 1 moreover comprises a filter line 30 that is connected on the atmosphere side to the primary filter apparatus 2 and corresponds to the secondary filter apparatus 3. The filter line 30 has both straight sections and curved sections.

Figure 10:
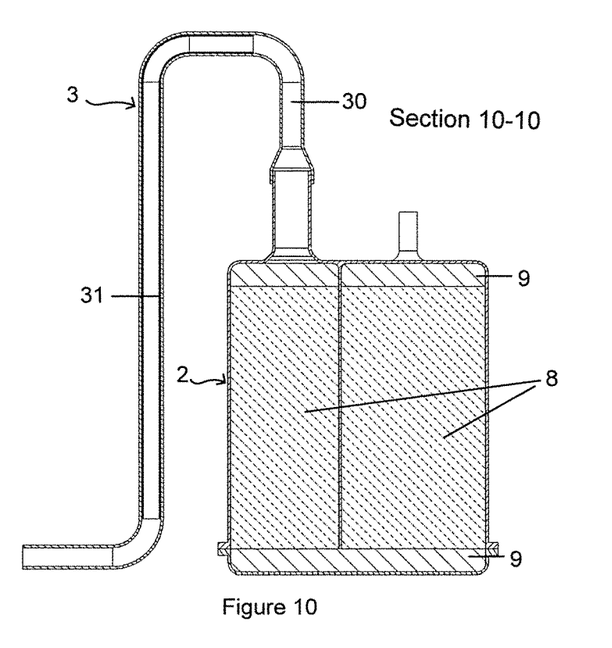
FIG. 10 shows a cross-section along line 10-10 of the filter system from FIG. 9.

FIG. 10 shows a cross-section along line 10-10 of the filter system 1 from FIG. 9. The filter system 1 has a secondary filter apparatus 3 with a filter line 30. At least in regions, the inside of the filter line 30 possesses a surface coating 31, wherein the surface coating 31 consists of a material comprising activated carbon. Alternatively, other adsorbent, or respectively absorbent materials can be used for the surface coating 31. The primary filter housing 4 has two chambers with activated carbon granules, as well as porous foam 9 in the regions of the tank connection 5, the purging connection 6, the connection of the two chambers, and the connection to the filter line 3. In the shown filter system 1, the purging air is conducted through the entire filter line 30 and then into the primary filter housing 4 during a purging process before the purging air is fed into the engine.

Figure 11:
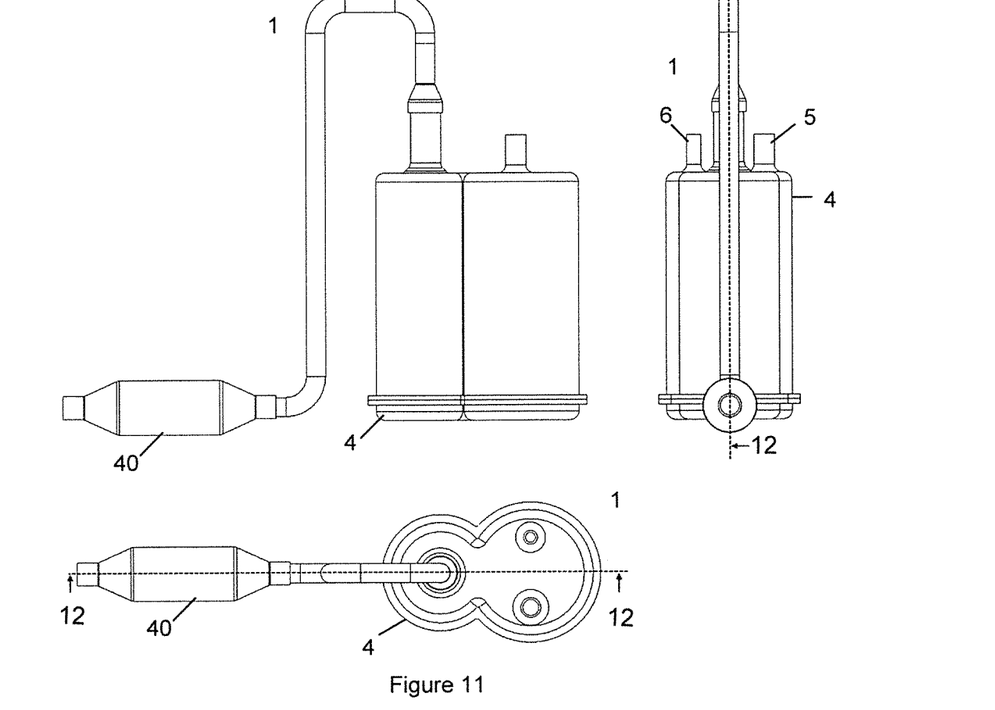
FIG. 11 shows different views of a filter system comprising a filter housing and a filter material according to another preferred embodiment of the invention.

FIG. 11 shows a filter system 1 according to another preferred embodiment of the invention. The filter system 1 comprises a primary filter apparatus 2 with a primary filter housing 4, wherein the primary filter housing 4 has a tank connection 5 and a purging connection 6. The filter system 1 moreover has a filter housing 40 that is connected to the primary filter apparatus 2. The primary filter housing 40 is suitable for containing a filter with adsorbent, or respectively absorbent material, in particular in the form of a star filter.

Figure 12:
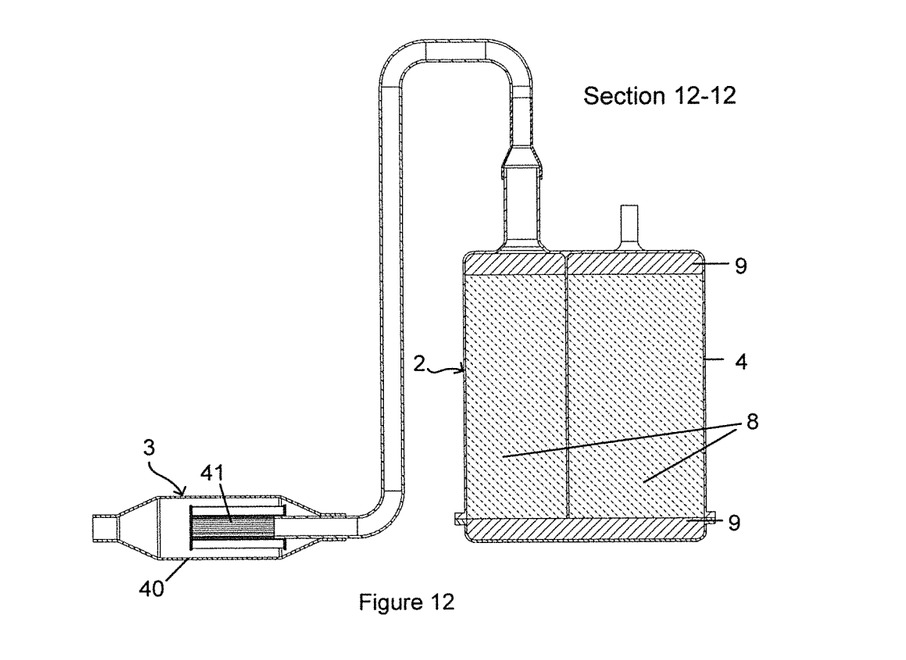
FIG. 12 shows a cross-section along line 12-12 of the filter system from FIG. 11.
Figure 13:
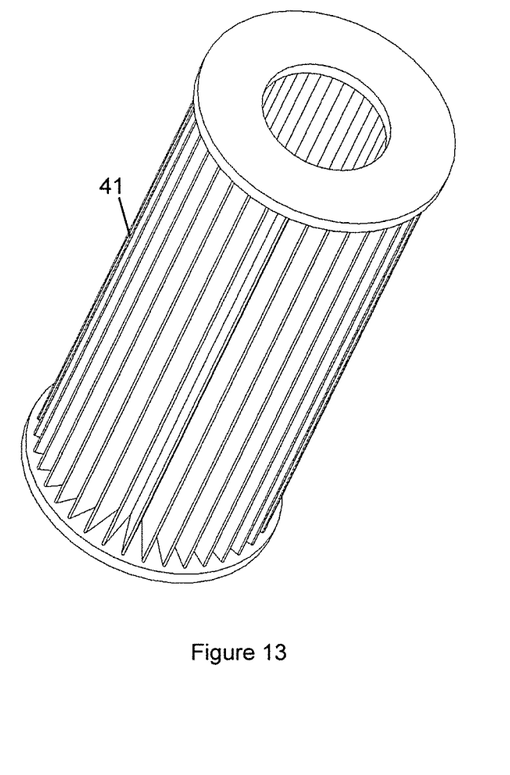
FIG. 13 shows a filter material in the form of a star filter for use with the filter system in FIG. 11 or FIG. 5.

FIG. 12 shows a cross-section along line 12-12 of the filter system 1 from FIG. 11. The filter system 1 has a secondary filter apparatus 3 with a filter housing 40 and a filter material 41. The filter material 41 is located in the filter housing 40. The filter material 41 is preferably a star filter that has paper and/or fleece with an air-permeable activated carbon coating, or respectively fibers comprising activated carbon. Such a filter material is shown in FIG. 13. The shown filter material 41 is a star filter, wherein the star filter 41 has fibers consisting of activated carbon, and wherein gases conducted into the filter system 1 flow substantially radially through the star filter 41.

LIST OF REFERENCE SIGNS

1 Filter system
2 Primary filter apparatus
3 Secondary filter apparatus
4 Primary filter housing
5 Tank connection
6 Purging connection
7 Cap
8 Activated carbon granules
9 Porous foam
10 Channel
11 Filter wall
20 Filter sleeve
21 Filter body
22 Channel
23 Filter wall
24 Channel wall
30 Filter line
31 Surface coating
40 Filter housing
41 Filter material

What is claimed is:

1. A filter system as part of a fuel vapor buffering apparatus to reduce hydrocarbon emissions, wherein the filter system comprises at least:
    a primary filter apparatus comprising a primary filter housing and one of:
        an adsorption material,
        an absorption material, or
        both the adsorption material and the absorption material; and
    a secondary filter apparatus comprising one of an adsorption material and an absorption material;
    wherein the secondary filter apparatus is provided on an atmosphere side of the primary filter apparatus;
    wherein the primary filter apparatus and the secondary filter apparatus are arranged in the filter system such that a gas conducted into the filter system flows through the primary filter apparatus and the secondary filter apparatus;
    wherein the secondary filter apparatus comprises:
        a plurality of walls defining channels adapted for gases flowing through; and
        a filter wall in surrounding relation to the channels;
    wherein the filter wall of the secondary filter apparatus is formed one of:
        integrally, or
        as a single part
    with the primary filter housing of the primary filter apparatus; and
        wherein both an inner surface of the filter wall and the walls defining the channels of the secondary filter apparatus have, at least in some regions, a surface coating comprising activated carbon for one of:
            absorbing materials,
            adsorbing materials, or
            both absorbing materials and adsorbing materials.

2. The filter system according to claim 1,
    wherein filter wall of the secondary filter apparatus comprises a filter sleeve comprising an elongated hollow body;
    wherein the filter sleeve is formed one of:
        integrally, or
        as a single part
    with the primary filter housing of the primary filter apparatus; and
        further comprising a filter body adapted to be inserted into the filter sleeve, and the filter body comprises said plurality of channels, wherein the channels are adapted for gases flowing through.

3. The filter system according to claim 1, wherein the surface coating comprises activated carbon for one of:
    absorbing hydrocarbon materials,
    adsorbing hydrocarbon materials, or
    both absorbing hydrocarbon materials and adsorbing hydrocarbon materials.

4. The filter system according to claim 1,
    wherein the filter wall of the secondary filter apparatus comprises a filter sleeve comprising an elongated hollow body;

wherein the filter sleeve is formed one of:
  integrally, or
  as a single part
with the primary filter housing of the primary filter apparatus; and
  further comprising a filter material adapted to be inserted into the filter sleeve, and
  wherein the filter material is one of:
    a paper filter,
    a fleece filter or
    both a paper filter and a fleece filter and
  wherein the filter material has, at least in some regions, one of:
    a coating,
    fibers or
    both a coating and fibers
comprising activated carbon.

5. The filter system according to claim 4,
  wherein the filter material is one of:
    a radial filter, or
    a star filter, and
  wherein gas conducted into the filter system flows through radially.

6. The filter system according to claim 1,
  wherein the secondary filter apparatus comprises a filter housing including the filter wall, and a filter material including the plurality of channels,
  wherein the filter material includes one of:
    a paper filter,
    a fleece filter, or
    both a paper filter and fleece filter and
  wherein the filter material has, at least in some regions, one of:
    a coating comprising activated carbon,
    fibers comprising activated carbon, or
    both the coating and fibers comprising activated carbon, and
  wherein gas conducted into the filter system flows through at least said regions.

7. The filter system according to claim 6,
  wherein the filter material is one of:
    a radial filter, or
    a star filter, and
  wherein gas conducted into the filter system flows through radially.

8. The filter system according to claim 1,
  wherein the secondary filter apparatus comprises a filter line with an elongated hollow body; and
  wherein at least one part of the inside of the filter line has a surface coating comprising activated carbon.

9. The filter system according to claim 8, further comprising another filter apparatus on an atmosphere side of the secondary filter apparatus, and said another filter apparatus comprising a filter housing with a filter material, wherein the filter material comprises activated carbon, and gas conducted into the filter system flows through at least some regions thereof.

10. The filter system according to claim 9, wherein the filter material includes a paper filter and, at least in said regions, has one of:
    a coating comprising activated carbon,
    fibers comprising activated carbon, or
    both the coating and fibers comprising activated carbon.

11. The filter system according to claim 10,
  wherein the filter material is one of:
    a radial filter, or
    a star filter, and
  wherein gas conducted into the filter system flows through radially.

12. The filter system according to claim 9,
  wherein the filter material is one of:
    a radial filter, or
    a star filter, and
  wherein gas conducted into the filter system flows through radially.

* * * * *